United States Patent
Goergen et al.

(10) Patent No.: US 12,555,143 B2
(45) Date of Patent: Feb. 17, 2026

(54) SYSTEM, METHOD, AND COMPUTER READABLE STORAGE MEDIA FOR MILLIMETER WAVE RADAR DETECTION OF PHYSICAL ACTIONS COUPLED WITH AN ACCESS POINT OFF-LOAD CONTROL CENTER

(71) Applicant: Cisco Technology, Inc., San Jose, CA (US)

(72) Inventors: Joel Goergen, Soulsbyville, CA (US); Kameron Rose Hurst, Sonora, CA (US); John Scott Scheeler, Pleasanton, CA (US); Alpesh Umakant Bhobe, Sunnyvale, CA (US); Dylan Thomas Walker, Austin, TX (US); Aaron P. Tondra, Massillon, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/389,639

(22) Filed: Dec. 19, 2023

(65) Prior Publication Data
US 2024/0127296 A1 Apr. 18, 2024

Related U.S. Application Data

(63) Continuation of application No. 16/929,389, filed on Jul. 15, 2020, now Pat. No. 11,915,276.
(Continued)

(51) Int. Cl.
*G06Q 30/00* (2023.01)
*G06Q 10/087* (2023.01)
(Continued)

(52) U.S. Cl.
CPC ....... *G06Q 30/0281* (2013.01); *G06Q 10/087* (2013.01); *G06Q 30/0631* (2013.01); *G06Q 30/0639* (2013.01)

(58) Field of Classification Search
None
See application file for complete search history.

(56) References Cited

U.S. PATENT DOCUMENTS

| | | | |
|---|---|---|---|
| 7,164,354 B1 * | 1/2007 | Panzer | G08B 21/0202 340/8.1 |
| 8,669,862 B2 | 3/2014 | Seshadri | |

(Continued)

FOREIGN PATENT DOCUMENTS

| | | |
|---|---|---|
| CN | 104765018 A | 7/2015 |
| CN | 107710012 A | 2/2018 |

(Continued)

OTHER PUBLICATIONS

J. Melia-Segui and R. Pous, "Human-object interaction reasoning using RFID-enabled smart shelf," 2014 International Conference on the Internet of Things (IOT), 2014, pp. 37-42. (Year: 2014).*

(Continued)

*Primary Examiner* — Kelly S. Campen
*Assistant Examiner* — Brittany E Bargeon
(74) *Attorney, Agent, or Firm* — Edell, Shapiro & Finnan, LLC

(57) ABSTRACT

A system includes a millimeter (MM) wave radar detector, where the MM wave radar detector generates signal data associated with a person of interest (POI) within a field of view of the MM wave radar detector. The system further includes an Access Point (AP) coupled with the MM wave radar detector. The AP includes a computing device to receive and analyze the signal data provided by the MM wave radar detector to determine a movement of the POI (Continued)

within an environment, and facilitate generation of a feedback response in response to the determined movement or action of the POI within the environment.

22 Claims, 5 Drawing Sheets

Related U.S. Application Data

(60) Provisional application No. 63/016,534, filed on Apr. 28, 2020.

(51) Int. Cl.
*G06Q 30/02* (2023.01)
*G06Q 30/0601* (2023.01)

(56) References Cited

U.S. PATENT DOCUMENTS

| | | | |
|---|---|---|---|
| 9,749,780 | B2 | 8/2017 | Huang et al. |
| 10,013,901 | B2* | 7/2018 | Chapuis ............. G06Q 30/0641 |
| 10,541,758 | B2 | 1/2020 | Goergen et al. |
| 10,652,800 | B2 | 5/2020 | Apostolopoulos et al. |
| 2004/0222302 | A1 | 11/2004 | Matsumori |
| 2005/0224427 | A1 | 10/2005 | Hatanaka |
| 2016/0349543 | A1* | 12/2016 | Rogers ................ H05B 47/115 |
| 2017/0228686 | A1 | 8/2017 | Bermudez Rodriguez et al. |
| 2018/0005247 | A1 | 1/2018 | Loeb et al. |
| 2019/0212436 | A1 | 7/2019 | Baheti et al. |
| 2019/0244453 | A1* | 8/2019 | Hewitt .................... G01S 13/04 |
| 2019/0272011 | A1 | 9/2019 | Goergen et al. |
| 2019/0342011 | A1 | 11/2019 | Goergen et al. |
| 2020/0073480 | A1* | 3/2020 | Hof ...................... G06F 3/04847 |
| 2020/0249819 | A1* | 8/2020 | Berquam .............. G06T 19/006 |
| 2020/0286356 | A1* | 9/2020 | Higashi ................. H04W 4/024 |
| 2020/0341114 | A1* | 10/2020 | Acharya ................. G01S 13/26 |
| 2022/0122496 | A1 | 4/2022 | Vlad Cluve |

FOREIGN PATENT DOCUMENTS

| | | |
|---|---|---|
| CN | 108153410 A | 6/2018 |
| CN | 108700645 A | 10/2018 |
| CN | 110894924 A | 3/2020 |
| WO | 2013049248 A2 | 4/2013 |
| WO | 2018016049 A1 | 1/2018 |

OTHER PUBLICATIONS

Chen C., et al., "mID: Tracking and Identifying People with Millimeter Wave Radar," Research Gate, May 2019, 9 pages.
International Search Report and Written Opinion in Counterpart International Application No. PCT/US2021/028346, mailed Jul. 27, 2021, 14 Pages.
Melia-Segui J., et al.,"Human-object Interaction Reasoning using RFID-enabled Smart Shelf", 2014 International Conference on the Internet of Things (IOT), 2014, pp. 37-42. (Year: 2014).
Zhao, P. et al., mid: Tracking and identifying people with millimeter wave radar, May 2019, in 2019 15th International Conference on Distributed Computing in Sensor Systems, pp. 33-40. (Year: 2019).
Office Action for Chinese Application No. 202180031846.X, dated Nov. 5, 2024, 21 Pages.
Office Action for Chinese Application No. 202180031846.X, dated May 29, 2025, 22 pages.

\* cited by examiner

SYSTEM, METHOD, AND COMPUTER READABLE STORAGE MEDIA FOR MILLIMETER WAVE RADAR DETECTION OF PHYSICAL ACTIONS COUPLED WITH AN ACCESS POINT OFF-LOAD CONTROL CENTER

CROSS REFERENCE TO RELATED APPLICATION

This application is a continuation of U.S. patent application Ser. No. 16/929,389, entitled "Millimeter Wave Radar Detection of Physical Actions Coupled With An Access Point Off-Load Control Center", filed Jul. 15, 2020, now U.S. Pat. No. 11,915,276, which claims priority under 35 U.S.C. § 119 (e) to U.S. Provisional Patent Application Ser. No. 63/016,534, entitled "Adapting MM Wave Detection of Physical Actions to an Access point Off-Load Control Center", filed Apr. 28, 2020, the disclosures of which are incorporated herein by reference in their entireties for all purposes.

TECHNICAL FIELD

The present disclosure relates to utilizing MM wave technology for detecting physical actions of a person.

BACKGROUND

Following human actions and movements and then determining a response has involved many technologies and different applications. An issue associated with systems that implement such features is the limited wattage dissipated in devices that would be installed in a room (e.g., hanging from a ceiling or connected in the room in some other manner). Radar and image processing associated with detecting and identifying physical actions or physical movements of a person of interest requires significant power and also significant power dissipation. Thus, it can be difficult to provide such detection systems effectively in areas of interest, and particularly in a networked system that can analyze signal data from such detection systems in an effective and timely manner.

DESCRIPTION OF EXAMPLE EMBODIMENTS

Overview

Figure 1:
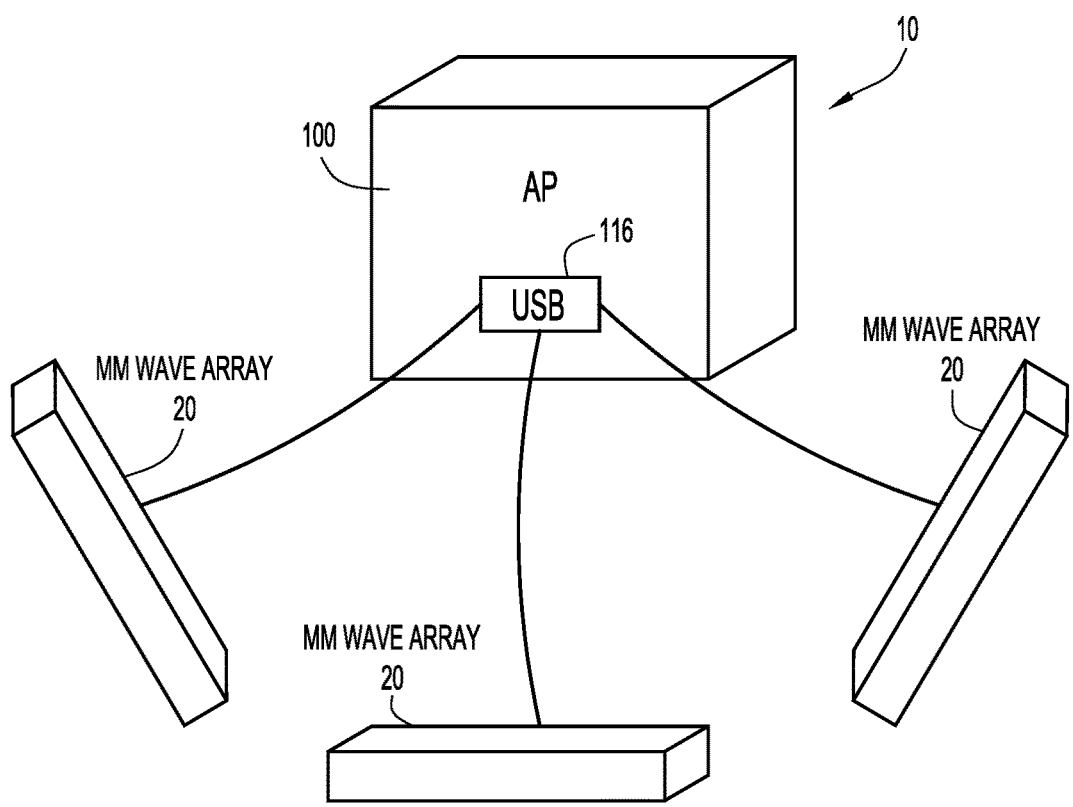
FIG. 1 depicts an embodiment of a detection system including a plurality of millimeter (MM) wave radar detectors coupled with an access point (AP) in a mesh network system for detecting and monitoring actions/movements of a person of interest (POI) and providing feedback information based upon or in response to such actions/movements.

In an embodiment, a system comprises a millimeter (MM) wave radar detector, where the MM wave radar detector generates signal data associated with a person of interest (POI) within a field of view of the MM wave radar detector. The system further comprises an Access Point (AP) coupled with the MM wave radar detector, the AP comprising a computing device to receive and analyze signal data provided by the MM wave radar detector to determine a movement or action of the POI within the field of view, and facilitate generation of a feedback response in response to the determined movement or action of the POI.

In another embodiment, a method comprises scanning a detection area in which a person of interest (POI) is located with a plurality of millimeter (MM) wave radar detectors so as to generate signal data associated with the detection area, analyzing the signal data via a computing device to determine a movement or action of the POI, and facilitating generation, via the computing device, of a feedback response by an external device proximate the detection area, where the feedback response is in response to the determined movement or action of the POI.

In a further embodiment, one or more computer readable storage media are provided and encoded with software comprising computer executable instructions and when the software is executed operable to control a plurality of millimeter (MM) wave radar detectors to scan a detection area in which a person of interest (POI) is located so as to generate signal data associated with the detection area, analyze the signal data to determine a movement or action of the POI, and facilitate generation of a feedback response by an external device proximate the detection area, where the feedback response is in response to the determined movement or action of the POI.

Example Embodiments

The present disclosure relates to a system including an Access Point (AP) that connects Millimeter Wave (MM wave) radar components to a network, e.g., in a meshed network system (where the AP provides one of a plurality of access points for the meshed network) for offloading signal data from the MM wave radar components to one or more computing devices (e.g., a computing device can be integrated with the AP or provided separate from but coupled with or in communication with the AP) in the network for detection of movements or actions by a person in a particular environment. The computing device includes one or more suitable software applications that include instructions which are operable to enable control of system operations by the computing device in the manner described herein. Based upon the MM wave radar detections, certain actions can also be taken via other devices coupled with the AP (and controlled by the computing device) in the network. In particular, a computing device associated with the meshed AP network system receives signal data (via the AP) from one or more MM wave radar detectors, analyzes the signal data to determine a movement or action of the person within a field of view of the one or more MM wave radar detectors, and generates feedback information to the person based upon or in response to the determined movement or action of the person (where feedback information can be in the form of information provided visually and/or in audio format via any one or more devices controlled by the system and in close proximity to the person).

Figure 2:
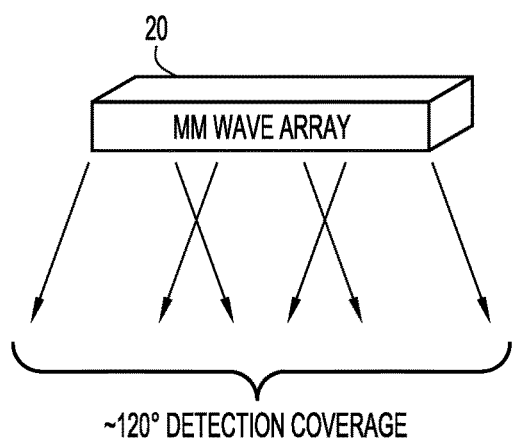
FIG. 2 depicts an example embodiment of a MM wave radar detector, showing a field of view of detection associated with the detector, for the system of FIG. 1.
Figure 3:
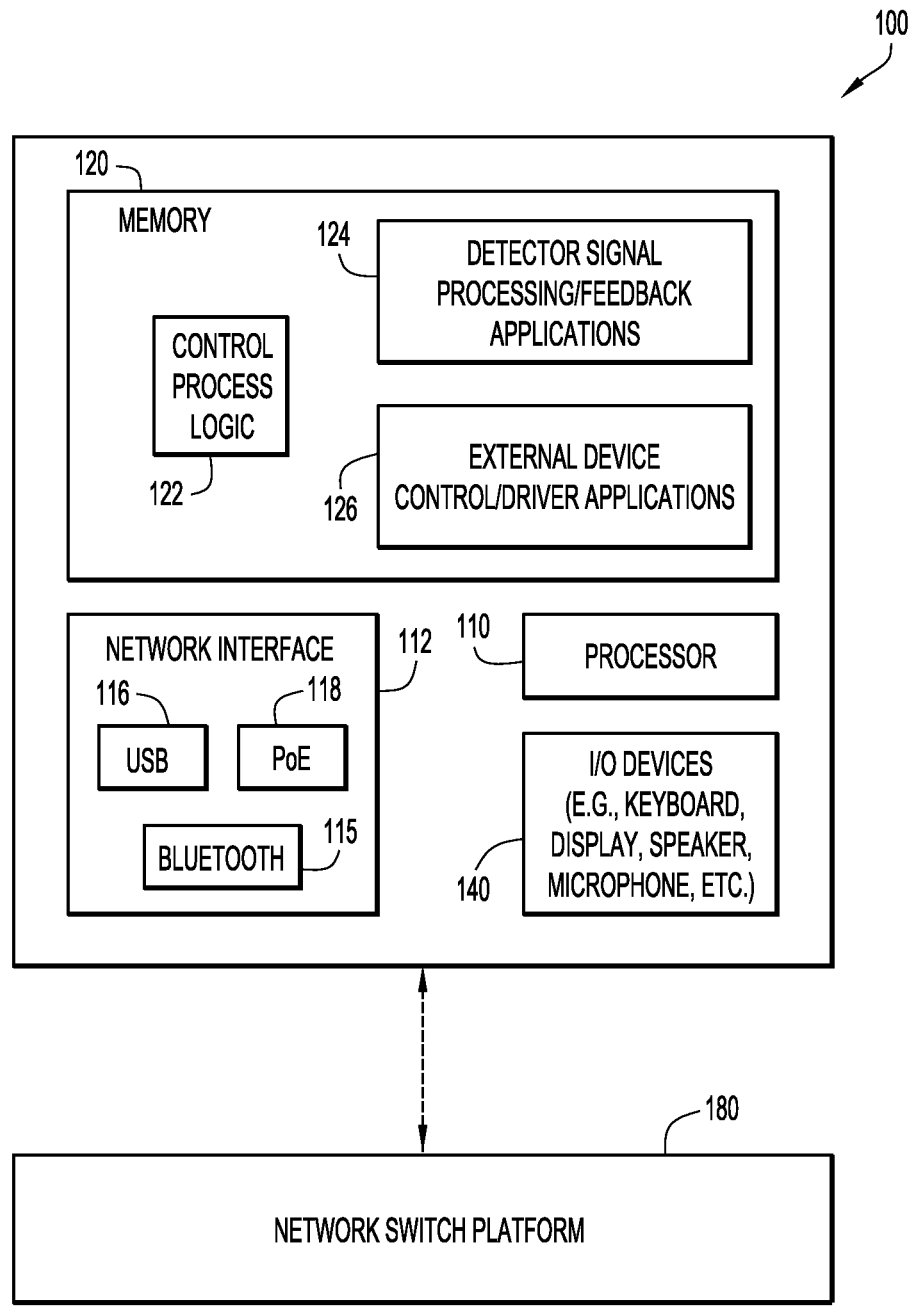
FIG. 3 depicts features of the access point (AP) for the system of FIG. 1.

Referring to FIGS. 1-3, an example embodiment of a system 10 is described in which one or more MM wave radar detectors 20 are connected with a meshed Access Point (AP) 100. Each MM wave radar detector 20 comprises a MM wave bar or array that transmits RF (radio frequency) signals within a set frequency range (e.g., about 30 GHz to about 300 GHz) range (e.g., at 1 mm) and with a corresponding wavelength in the 1-10 mm range (e.g., about 1 mm) Each detector 20 is configured as a transceiver to transmit RF signals (via Tx antennas) toward a target area so as to cover or encompass a detection field from the detector of about 120° (where optimal coverage can be a 90° window within the detector array). Each detector 20 further scans for the reflected RF signals that bounce off an object, such as a person of interest (also referred to herein as a POI) located in the detection range. The reflected signals captured by each detector 20 (via Rx antennas) can be combined and used to form an image that is representative of the POI by "painting" the detected POI from which the signals are reflected from. A POI within the field of view of the detectors 20 can thus be identified, as well as precise movements or actions of the POI, such as arm movements toward an object, head movements that suggest an object or area which the POI may be viewing at a moment in time, identification of a current direction in which the POI is currently moving, etc.

Any selected number of MM wave radar detectors 20 can be arranged for the system 10 and oriented in relation to each other and over a desired detection area to provide sufficient detection coverage for the detection area in which it is desired to detect physical movements or physical actions of a person within the detection area. For example, a single detector 20 can be implemented for certain scenarios. Alternatively, any selected number (e.g., two, three, four or more) detectors 20 can be provided for certain scenarios in which more signal data might be desired to accurately identify and detect movements and/or actions of a person of interest (e.g., three detectors 20 are depicted in the system 10 of FIG. 1). The detectors 20 can each connect directly with the AP 100 (as shown in FIG. 1). Alternatively, the detectors 20 can connect with a main detector 20, where the main detector 20 then connects with the AP 100. The connection of detectors with the AP 100 can be via any suitable connection, such as a Universal Serial Bus (USB) connection, that facilitates transfer of signal data and can further facilitate power supply to each of the detectors from the AP.

Radio frequency signal data is provided from the MM wave radar detectors 20 (either individually or via a main detector) to the AP 100 for processing to identify and detect physical movements or physical actions of a person of interest (POI). As previously noted, the AP 100 can provide two way signal communications with the detectors 20 as well as electrical power via a suitable connection (e.g., one or more USB connectors 116, which form part of a network interface 112 of the AP). The AP 100 can further provide other connections, such as Power over Ethernet (PoE) connections and/or other types of cable and/or system network connections (which provide both high speed data and higher electrical power connections over greater ranges than typical PoE connections), to the detectors 20 as well as further components of the network so as to communicate with and control such components as well as provide electrical power to such components for certain system embodiments as described herein. Further still, the AP 100, detectors 20 as well as other components of the system can be configured with suitable hardware and software to send and receive wireless communications (e.g., via Bluetooth wireless technology) with the AP and/or other components associated with the system for certain embodiments as described herein.

Referring to FIG. 3, the AP 100 comprises one or more computing devices that include one or more processors (e.g., depicted as processor 110), one or more memory structures (depicted as memory 120), a network interface 112 that comprises any suitable hardware (e.g., one or more of an Ethernet interface card or switch, a router, one or more USB connectors 116, one or more suitable hardwire connectors 118 such as PoE or other suitable cable connections that facilitate transfer of data as well as provide a supply of electrical power over a short and/or longer lengths, Bluetooth hardware 115, etc.) that facilitates a hardwire and/or wireless connection with one or more other computing devices associated with the system 10, and any number of Input/Output (I/O) devices 140 (e.g., a keyboard, a display, a speaker, a microphone, a camera, a mouse or other suitable cursor controller, etc.) that facilitates interaction with a user of the computing device(s) for the system. The AP 100 can be integrated as a single unit or comprise a plurality of separated computing devices coupled for communication and exchange of information with each other (via the network interface 112). Each computing device of the AP 100 and/or other components of the system can utilize any suitable operating systems (e.g., Android, Microsoft Windows, Apple macOS, Apple iOS, Linux, etc.) to facilitate interaction, communications, and exchange of data, operational instructions and/or any other types of content with other computing devices associated with the system.

The memory 120 of the AP 100 may comprise read only memory (ROM), random access memory (RAM), magnetic disk storage media devices, optical storage media devices, flash memory devices, electrical, optical, or other physical/tangible memory storage devices, and any combinations thereof. The memory 120 can be provided on a single computing device or a plurality of computing devices of the AP 100. The processor 110 can comprise at least one microprocessor that executes control process logic instructions 122 stored within memory 120 including operational instructions and software applications stored within such memory. In general, the memory 120 may comprise one or more tangible (non-transitory) computer readable storage media (e.g., a memory device) encoded with software comprising computer executable instructions and when the software is executed (by the processor 110) it is operable to perform the system operations described herein for an identification and detection of a POI as well as physical actions and/or physical movements of the POI (via analysis of signal data received by the detectors 20) and provide feedback information to the POI for the embodiments as described herein.

In particular, the memory 120 includes an application module 124 comprising one or more software applications that, when executed via the processor 110, analyze and process signal data received from the detectors 20 and control one or more external device components of the system 10 to provide feedback information to the POI in response to the processed and analyzed signal data. The memory 120 further includes an application module 126 comprising one or more software driver applications that, when executed via the processor 110, facilitate control and operations of external device components that provide the feedback to the POI.

External device components (also referred to herein as external devices) that can be in communication with and controlled by the AP 100 to facilitate providing feedback information to a POI will depend upon a particular scenario in which the system 10 is integrated. Some non-limiting examples of external devices that can be coupled (e.g., via hardwire and/or wireless connections) with the AP 100 include remotely controlled lighting devices (e.g., LEDs, LCDs, etc.), remotely controlled displays (e.g., LCD or LED display screens), remotely controlled (e.g., electromechanical) servomotors coupled with some object, remotely controlled audio speaker devices, and remotely controlled portable computing devices (e.g., mobile phones or PDAs, etc.), where such devices can be accessed and/or controlled via the AP to provide some form of feedback output to the POI in response to a detected physical action or movement of the POI.

Depending upon the number and/or types of external device components to be coupled with the AP 100, at least a portion of the network interface of the AP 100 can be integrated within a suitable network switch platform 180 as depicted in FIG. 3. The network switch platform 180 can be integrated with the AP 100 or comprise a separate component that includes the same or similar hardware components (i.e., processor, memory, network interface, one or more I/O components, etc.) as previously described herein for the AP 100. An example embodiment of a suitable network switch platform for use in the system 10 is a Cisco Catalyst 9000 Series switch platform (Cisco Technology, Inc.).

The network platform 180 ensures fast and reliable communications, e.g., in an Internet of things (IoT) environment, with various external devices coupled with the AP and can also provide suitable electrical power via PoE or other suitable cable connections to such external devices. In particular, external (e.g., IoT) devices as well as any other types of devices over the system network (including any component of the AP 100) may have both their data connectivity and power needs met over a single combined function cable. Conventional examples of technologies that provide this function are USB (Universal Serial Bus) and PoE (Power over Ethernet). In conventional PoE systems, power is delivered over the cables used by the data over a range from a few meters to about one hundred meters. When a greater distance is needed or fiber optic cables are used, or depending upon the power requirements based upon the types and/or number of network devices to be powered, power can be supplied through a local power source such as a wall outlet, where the cables can be modified to provide increased electrical power along with higher data speeds over greater distances. An example embodiment which provides combined power, data and cooling from a central network device over cables to a plurality of devices and which can be implemented as part of the network platform 180 and/or as part of the network system 10 is described in U.S. Patent Application Publication No. 2019/0272011. Other non-limiting examples of types of systems which provide high power and data delivery over a network in a safe manner and with fault protection and which can be implemented as part of the network platform 180 and/or as part of the network system 10 are described in U.S. Patent Application Publication No. 2019/0342011 and U.S. Pat. No. 10,541,758.

While not shown in FIGS. 1-3, an offload device can also be provided which includes one or more components directly attached to one or more MM wave radar detectors and/or the AP, where the offload device provides MM wave image processing based upon the signals generated by the detectors. Alternatively, the AP 100 can receive the raw signal data from the detectors and provide MM wave image processing directly at the AP (e.g., utilizing application module 124).

Figure 4:
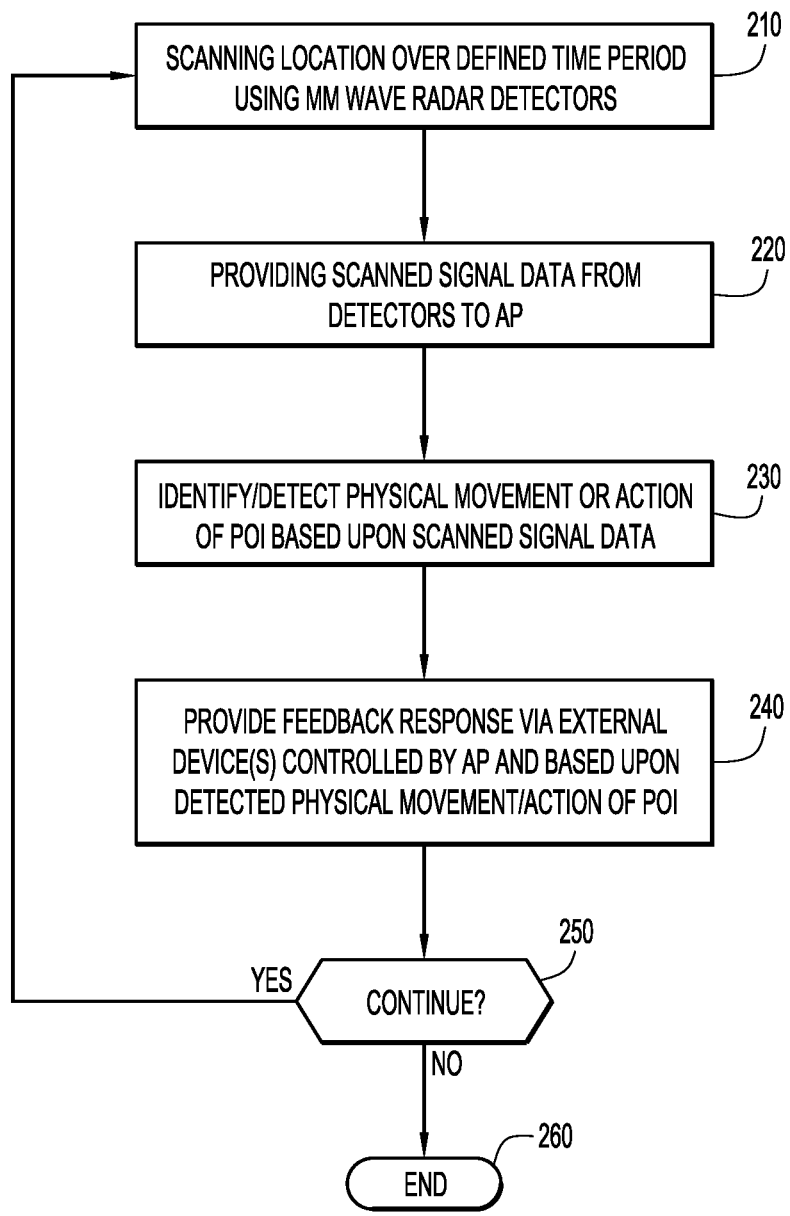
FIG. 4 is a flowchart depicting a process of detecting, identifying and monitoring actions/movements of a person of interest (POI) and providing a feedback response based upon or in response to such detected actions/movements utilizing the system of FIG. 1.

An example method of utilizing the system 10 is described with reference to the flowchart of FIG. 4. The MM wave radar detectors 20 are arranged at a particular location or area of detection (e.g., in a store or other building) in which it is desired to detect movements or actions of people for a particular scenario or particular implementation of the system 10. At 210, the detectors 20 scan the location over a defined time period (e.g., over a period of seconds or a period of minutes) by transmitting RF signals at a suitable frequency and capturing reflected RF signals within the range of each detector. At 220, reflected signal data over the defined time period is provided to the AP 100 by the detectors 20 (e.g., via the USB connections between detectors and AP).

At 230, the signal data received by the AP 100 is processed (via application module 124) to identify whether a POI is in the particular location or area of detection and also identify (e.g., by generating a MM wave radar image of the POI and further analyzing the image) whether the POI is engaging in a particular physical movement or physical action. The physical movement or physical action is detected based upon analysis of the signal data that is provided by the detectors to the AP over the defined time period, where the signal data can be analyzed to define or "paint" an image of the POI (based upon the location of reflected RF signal data points in a three dimensional space encompassed by the range of detection associated with the detectors), including an indication of body parts (e.g., head and limbs) of the POI and how such body parts are oriented and/or moving as well as whether and in what direction the POI is moving within the detection location and within the defined time period of detection.

In response to the analysis and detection/determination of specific physical movements and/or physical actions by the POI, at 240 the AP 100 directs (via application module 126) one or more physical devices to output a feedback response (e.g., in the form of a visual response, audio response, and/or some form of information). In some embodiments, the feedback response may be provided directly to the POI. In other embodiments, the feedback response may be provided to another who may be monitoring movements or actions of the POI. In further embodiments, the feedback response may be provided to both the POI and another. The type of response output may depend upon a particular scenario or environment in which the system 10 is implemented as well as the types of external devices that are coupled with the AP. Some non-limiting examples of output responses by external devices controlled by the AP include physical movement of an object at or near the detection area (e.g., to direct the attention of the POI toward the object), light emission at or near the detection area (e.g., turning on one or more LED or LCD lights), video image at the detection area (e.g., display of information about a product or service available for purchase or something associated with the detection area), audio alert signal or message (e.g., live or recorded audio content or an audio alert signal), etc., as well as any combinations of such responses.

Upon providing feedback information to the POI, a determination is made at 250 as to whether further detection of physical movements and/or actions within the detection area are necessary based upon a particular scenario. For example, the system 10 may be configured for single detection and feedback response (in which case the method ends at 260 after a single feedback response has been provided by the system) or continuous detection and feedback responses provided to the POI by the system. If the system 10 is configured to continuously detect and identify POI movements and/or actions, the method is repeated starting again at 210.

The system 10 can continuously detect/identify specific physical movements or actions and provide a feedback response that is specific to such detected/identified physical movement or action. For example, the type of feedback response can be altered depending upon the type of detected movement or action by the POI and/or based upon whether a specific feedback response was already provided. For example, after a first time period of RF signal analysis and detection, the system can be configured to provide a specific response (e.g., turn on LED or LCD light at or near the detection area) based upon a specific POI physical movement or action that was detected. In a subsequent time period of RF signal analysis and detection, the system can be configured to provide a different physical response (e.g., effect movement of an object at or near the detection area) based upon the same or different specific POI physical movement or action that was detected in relation to the first time period of analysis and detection. In certain scenarios, this can facilitate a modification (e.g., escalation) of types of feedback responses. The system may also be configured to repeat the process continuously for only a set number of detection period cycles.

Thus, the system described herein and depicted in FIGS. 1-3 can be implemented in a number of environments in which POI physical actions and/or movements, and optionally with system actions taken based upon such POI actions and/or user movements. In particular, the system can be configured to detect a particular image of the POI, or a change in the image of the POI, or a physical response or action associated with POI within the detection area or field of view of one or more MM wave radar detectors (based upon processing of the signal data provided by the detectors), and the system can further generate a visual and/or audio response (or some other sensory notification) as feedback information to the POI. The system can then wait for more physical change of the POI as detected based upon the signal data from the MM wave radar detectors.

Figure 5:
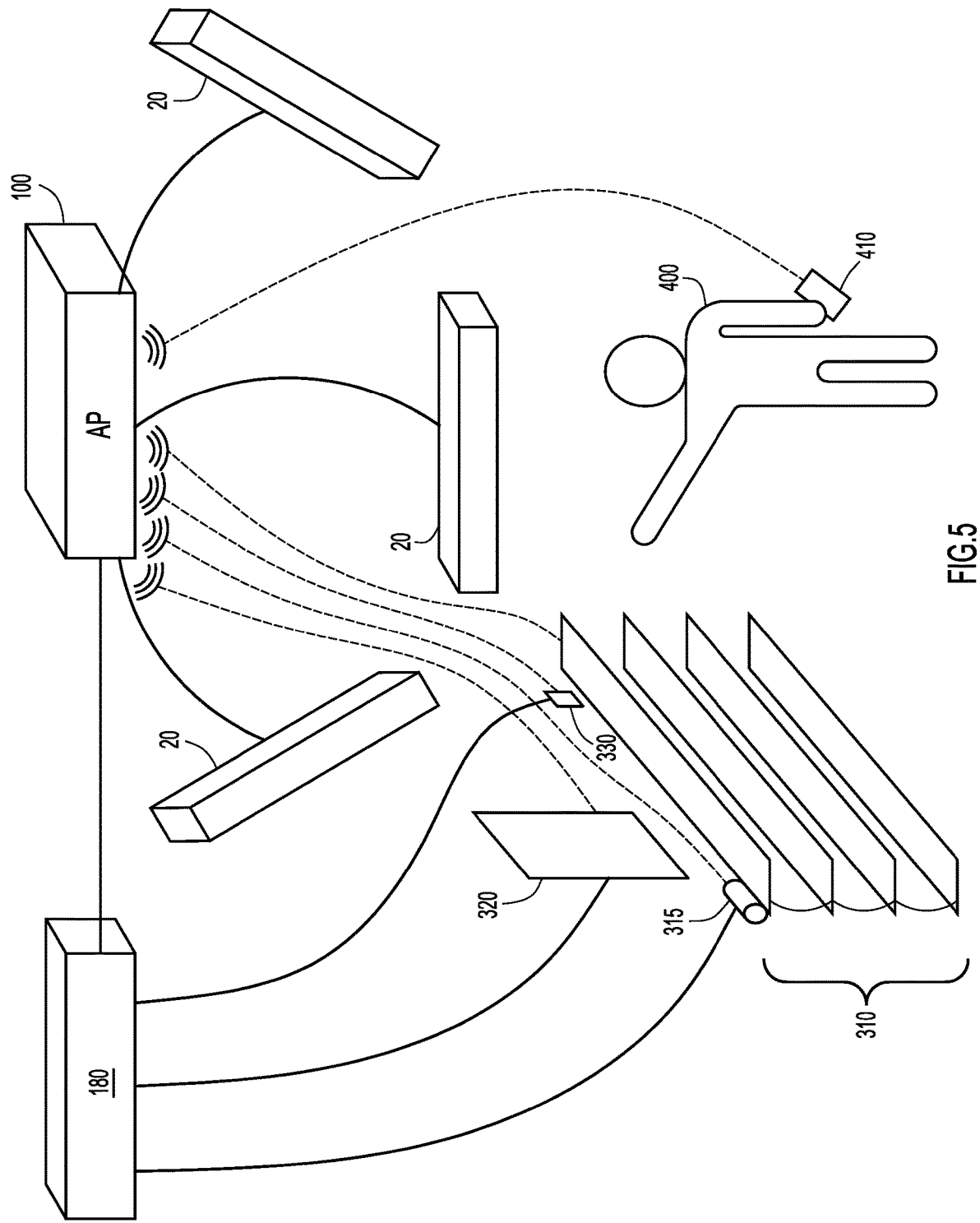
FIG. 5 depicts an example embodiment of a commercial environment implementing the system of FIG. 1 for detecting and monitoring actions/movements of a customer and providing feedback information (including product information) to the customer based upon or in response to such actions/movements.
Figure 6:
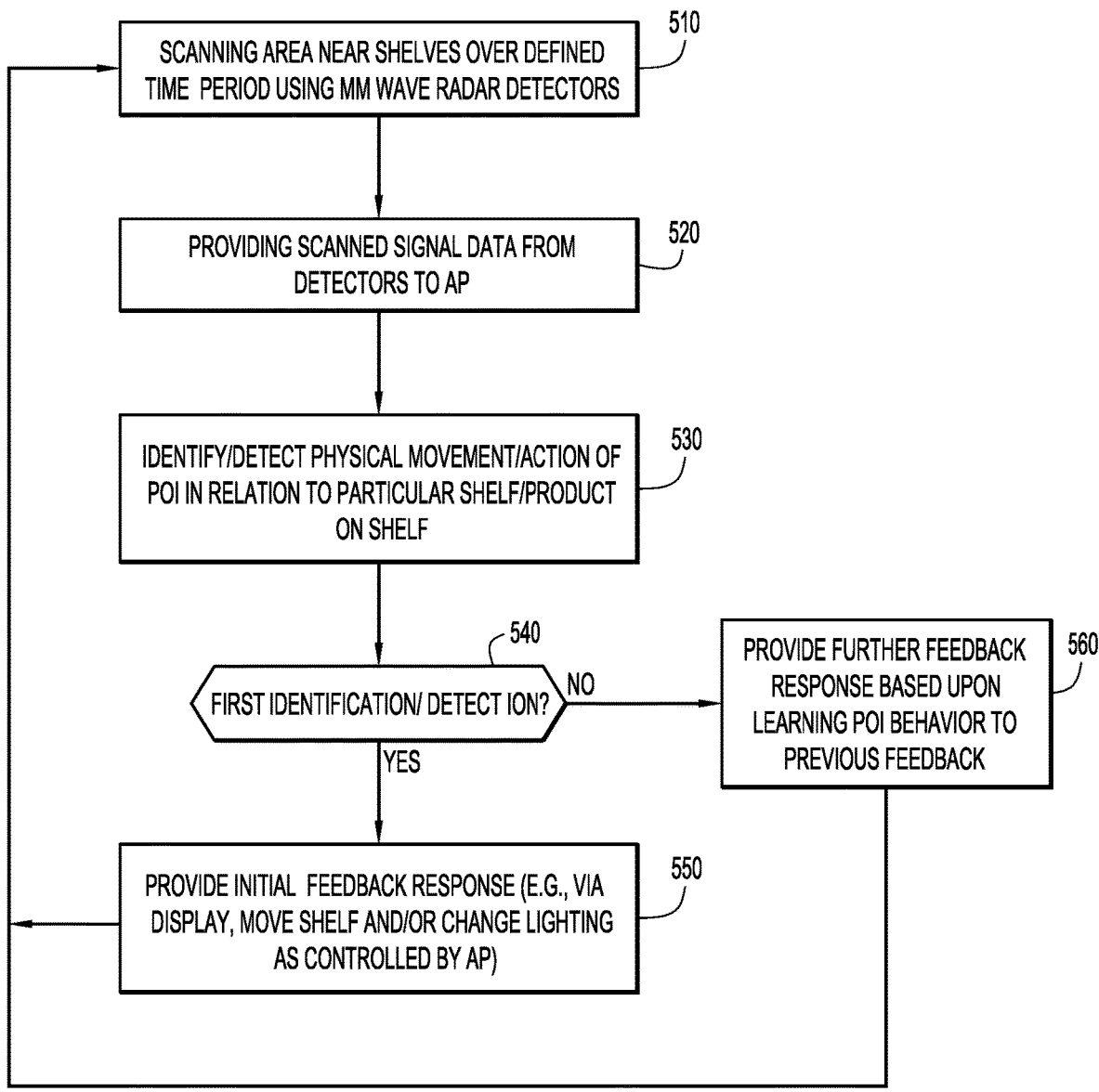
FIG. 6 is a flowchart depicted a process of detecting, identifying and monitoring actions/movements of the customer and providing a feedback response based upon or in response to such detected actions/movements utilizing the example embodiment of FIG. 5.

An example embodiment which implements the system 10 into a specific environment is now described with reference to FIGS. 5 and 6. Referring to FIG. 5, the system 10 is implemented in a commercial or retail environment in which the POI is a potential customer and the detection area comprises a location in a store that includes products on display and available for purchase (e.g., grocery items, electronics items, textile/fabric/clothing items, etc.). In particular, products can be arranged on a series of shelves 310, where each shelf 310 includes an electronically controlled servomotor (shown generally as element 315 in FIG. 5) that is hardwire connected via a suitable hardwire connection with the network switch platform 180 (so as to receive electrical power therefrom) and coupled wirelessly (e.g., via Bluetooth) and/or via hardwire (via network switch platform 180) to the AP 100 (so as to receive control signals from the AP). Each servomotor (via control by the AP 100) can be operated to effect a movement (e.g., vibrational movement, linear and/or rotational movement) to the corresponding shelf 310 to which the servomotor is connected so as to provide a selective feedback response. One or more lighting elements (e.g., a lighting element 330 as depicted in FIG. 5) can be provided at any one or more suitable locations along each shelf 310 (e.g., at or near one or more products located on a particular shelf). Each lighting element 330 is also hardwire connected to the network switch platform 180 (so as to receive electrical power therefrom) and wirelessly coupled (e.g., via Bluetooth) and/or via hardwire (via network switch platform 180) to the AP 100 (so as to receive control signals from the AP). Each lighting element 330 (e.g., a LCD or LED light) can be selectively controlled by the AP 100 to turn on or off as a selective feedback response. Further, a display panel 320 (e.g., LCD or LED display panel) is provided that is hardwire connected to the network switch platform 180 (so as to receive electrical power therefrom) and wirelessly coupled (e.g., via Bluetooth) and/or via hardwire (via network switch platform 180) to the AP 100 so as to achieve selective operation of the display panel 320 by the AP to provide selective content as a feedback response (by controlling output of such content by the display).

Operation of the system 10 in commercial or retail environment of FIG. 5 is described with reference to the flowchart of FIG. 6. At 510, a detection area defined at a location adjacent or in close proximity to the plurality of shelves 310 is scanned (by transmission of RF radar waves toward the detection area and capturing reflected waves) over a defined time period by the detectors 20. At 520, the RF signal data from the detectors 20 is provided to the AP 100. At 530, the signal data is analyzed by the AP 100 (using application module 124). The analysis of the signal data by the AP may include processing the signal data to identify and form an image of a POI 400 in the detection area (where the signal data is processed to "paint" an image of the POI). The analysis may further include detection of a physical movement or action of the POI 400 in relation to a shelf 310 and/or a particular product on the shelf 310. For example, the detection analysis by the AP may include a determination of a physical movement of a limb or body part of the POI 400, such as the POI's arm or hand, toward a particular shelf and/or a particular product on a shelf 310 (e.g., POI may be pointing at a product or reaching toward or even picking up a product on the shelf). The detection analysis may also include a determination of what the POI might be looking at, e.g., based upon a specific directional movement of the POI's head in a direction toward a particular shelf or a particular product on a shelf. In this scenario, the AP 100 has stored in its memory 120 or has access to (e.g., via a product inventory database of the store or building in which the system 10 is integrated) information about products on the shelves 310 at the detection area, including specific locations of such products on each shelf 310.

At 540, if the identification/detection process of 530 is an initial (i.e., first) identification of the POI and detection of an initial physical movement or action (based upon analysis by the AP 100 of the signal data provided by the detectors 20), the process proceeds to 550. At 550, an initial feedback response is provided to the POI via any of the external devices that are controlled by the AP 100. For example, the AP can provide information about the product pointed at or held by the POI, or alternatively provide information, via controlled output by the display panel 320, about a plurality of products located on the particular shelf 310 based upon or in response to detection of the POI movement or action. The AP can also change the lighting associated with the shelf and/or the product on the shelf by turning on one or more lighting elements 330 controlled by the AP or, alternatively, turning on and/or off or controlling the intensity of one or more lights associated with one or more shelves or one or more products on the shelves. Alternatively, the AP can control movement of a shelf 310 (e.g., vibrating a shelf) via operation of one or more servomotors coupled with the AP.

For example, if detected physical actions of a POI within a detection time period provide an indication that a POI has picked up a particular product and then set it back on the shelf 310, vibration of the shelf can be initiated by the AP controlling operation of the servomotor coupled with the shelf. Alternatively (or in combination with vibrational movements of the shelf), the AP 100 can control the display panel 320 to output information about the product (e.g., price of the product, a description of the product such as product specifications and/or product contents, any current sale or discount associated with the product, information about another product related to the product, etc.) which is visible to the POI. In a scenario in which a POI points or reaches toward (or is looking at) a location on a shelf 310 in which a product space is empty (the AP 100 can determine, e.g., via the product inventory information for the store that is accessible to the AP, whether a particular product is not in stock on the shelf 310), the AP 100 can control the display panel 320 to output information in relation to other locations where the product is available within the store (e.g., further products located in back storage inventory area of the store) or other stores offering the product. Alternatively, the AP 100 can control the display panel 320 to output information about one or more alternative and related products (available in the store and/or elsewhere) that are identified as having the same or similar attributes as the particular product that is determined to be of interest to the POI. For example, the AP 100 may have access to a database (e.g., as part of an inventory of the products in the store) that lists alternative products considered related to the product of interest that is not currently available in the store. Further, the AP 100 can control one or more lighting elements 330 to turn on or off (or control/change the intensity of such lights) to focus the POI's attention back toward the product that was previously picked up on the shelf 310.

After 540, the operation is repeated, returning to 510 so as to further monitor the POI to see how the POI reacts to the feedback response that was provided.

Returning again to 540 (after scanned signal data is identified/detected for a further physical movement or action by the POI), and when the AP is a making a successive identification/detection, the operation proceeds to 560 in which a further feedback response can be provided to the POI by the AP controlling the external devices. The further feedback response can be the same type of feedback response (e.g., by the same external device controlled by the AP) or a different type of feedback response (e.g., by a different external device controlled by the AP). After providing the further feedback response, the operation is again repeated (returning to 510) for a suitable number of further iterations. The successive identification and detection of movements or actions of the POI can be utilized to determine how the POI reacts to each previous feedback response. This allows the system 10 to learn and obtain a deeper understanding of the intentions of the POI with regard to the POI movements or actions. This in turn can facilitate providing modified feedback responses to the POI which may result in enhancing a decision of the POI to purchase a particular product. For example, an initial feedback response provided by the POI, and based upon or in response to a determined physical movement or action of the POI in relation to a particular or specific product on a shelf 310, can be movement (e.g., vibration) of the shelf 310 and/or controlling one or more lighting elements 330 associated with the product or shelf (e.g., located directly above the product on the shelf) to turn on and/or off (or changing the intensity of one or more such lights). Such feedback response(s) can be provided to assist in further attracting attention of the POI or maintaining the POI's interest in the product. A successive feedback response (e.g., based upon or in response to a detection of a subsequent POI movement or action that indicates the POI has a reduced level of interest in the product) may be providing information about the product on the display panel 320, such as price of the product, offering a store discount, coupon or other cost savings in relation to the product and/or any other related product.

The embodiment of FIG. 5 can also implement other external devices to provide feedback information to the user, including audio devices (e.g., speakers) to direct the attention of the POI toward a product or shelf in which previous interest of the POI was identified/detected. In addition, in scenarios where the POI 400 is carrying a personal and portable electronic device 410, such as a mobile phone/smart phone or any other type of personal digital assistant (PDA) device, such portable electronic device may be accessible to the AP 100 for sending information associated with the product deemed of potential interest to the POI. For example, in scenarios in which the electronic device of the POI has access to the system network associated with the AP 100 (e.g., the store or building may offer WiFi access to customers), the AP 100 can identify the POI 400 based upon a unique identifier associated with the POI's electronic device that may be in some form of communication with the system network (e.g., via Bluetooth or other wireless communication). Feedback responses by the AP 100 can be provided to the portable electronic device 410 of the POI 400 (e.g., via Bluetooth or other wireless communication) regarding product information (e.g., product pricing, product discounts such as coupons provided directly to the POI's electronic device, product location in the store in which the POI is present as well as other store locations, etc.). Further, the AP 100 may learn about personalized product information associated with the POI, via identification of the POI based upon the unique identifier for the electronic device of the POI and via customer databases showing purchasing preferences and/or purchasing history of products associated with the POI. Based upon such learned personalized product information associated with the POI, the AP 100 can focus or tailor specific product information that may be of value to the POI in making a purchasing decision for a product within the store.

In another example scenario for the environment of FIG. 5, one or more shelves 310 can include representations or markers for products instead of the actual products. For example, the product marker can comprise a paper slip or ticket for the product, or an empty box or container that shows a representation of the product but does not include the product itself. This scenario can exist in certain retail environments in which the product is either too large and/or too heavy to be carried by the customer/POI to a check-out/sales counter. In other retail environments, the actual product may be particularly expensive (e.g., a computer or other electronics product) such that control of the product prior to a sale to the customer is carefully controlled (e.g., for security purposes/prevention of theft). When one or more identification/detection processing steps 530 have occurred by the system 10 that detects the POI picking up the product marker, holding the product marker and/or carrying the product marker away from the shelf 310 from which it was removed, a feedback response generated by the system (e.g., at step 540 or step 560) can include providing an alert message, via the AP 100, to a store employee (e.g., via a display accessible by the store employee, to a portable electronic device being carried by the store employee, etc.). The alert message provided to the store employee can be to pick the product (i.e., the product associated with the product marker being carried or held by the customer/POI) from a storage location within the store (e.g., in a back room area or an inventory/stock area that is accessible only by store employees) to a store check-out or purchase location at which purchase of the item will occur by the customer/POI. In addition, the AP 100 can be implemented to have access to a store inventory of products so that the AP 100 can confirm whether the product of interest is available (e.g., located within the inventory location and/or located at another location within the store). Inventory information about the product can be provided as part of the alert message to the store employee (to help facilitate picking of the product and transport to the purchase location within the store). Further, if the AP 100 (in accessing the inventory) determines that the product is unavailable (e.g., out of stock) in the store, the AP 100 can provide feedback information to the customer/POI such as alternative products that are determined as having similar qualities, functionalities or attributes as the unavailable product. Products deemed as related can be determined by the AP 100, e.g., the store inventory information that is accessible to the AP 100 (e.g., the store inventory can include, for each product in the inventory, one or more alternative products deemed related to the product). This can enhance the purchasing experience for customers by decreasing wait times that might otherwise occur at check-out locations, since the product to be purchased can be transported from a stock location in the store to the check-out location prior to or at about the time the customer/POI carrying the product marker arrives at and/or is completing purchase of the product. In addition, for unavailable (e.g., out of stock) products, alternative products can be presented to the customer/POI which also enhances the customer experience within the store.

Thus, implementing the system in a commercial or retail environment can enhance the shopping or purchasing experience of a customer as well as enhance the number and/or types of commercial/retail sales for businesses.

System embodiments as described herein can also be implemented in other environments in which physical actions or movements of a person of interest (POI) can be detected and information can be provided to the POI based upon such actions/movements as well and also based upon the context of the environment.

For example, the systems described herein can be implemented for use in emergency or other safety applications, where identification and detection of physical movements or actions of a POI in a detection area or region of interest via the combination of MM wave radar detectors and an AP can detect human response during emergency incidents to achieve the following: proper direction for exiting in a fire (e.g., by flashing lights or redirecting people should they be moving the wrong way as detected by the MM wave radar detectors), directing fire fighters to the source of a fire using messaging or sound or vibration in response to visual reactions detected by the MM wave radar detectors, directing medical teams to the appropriate area in a building based upon MM wave radar detection, etc.

In a specific example scenario in which the system 10 is implemented in a building structure for emergency applications, a plurality of MM wave radar detectors 20 can be placed at a variety of locations within the building structure, along with external devices, such as audio and/or visual alarm elements, that are automatically controlled by the AP 100 in feedback response to detected POI movements or actions within one or more detection areas within the building structure. The external devices, such as lights and/or speakers, can be arranged, e.g., along one or more halls within the building structure. The external devices can be selectively activated and deactivated based upon detected POI movements, such as movements along the hallway of the building structure. For example, lights and/or audio alarms or broadcasts (which indicate a recommended direction of movement) can be activated in a direction along hallways and corridors to guide a POI to an emergency exit and/or away from an emergency situation within the building structure (e.g., a detected fire or other detected emergency event within the building structure).

In other example embodiments, the system 10 described herein can be implemented for use in tracking lost children or other POI in a store, a school, a hospital, or some other public or private building structure (e.g., children who are wandering and/or acting confused, scared, etc. in a store can be tracked, with security personnel being alerted to such children). In addition, children can be tracked using MM wave radar detectors at detection areas such as inlets and outlets (or other locations) of a store or other building structure and the AP 100 providing feedback output for safety purposes. In this environment, the system 10 can be used to determine one or more persons with whom a child (who is the POI) is entering and/or leaving a building. The MM wave radar detectors can be configured to provide a sufficiently detailed image of a specific POI and others with whom the POI is with at such detection areas so as to identify the specific POI and also the others with the specific POI. Feedback responses can be provided by the AP 100, such as information to store employees (e.g., security personnel) via external devices associated with such employees, in scenarios in which there is a detection of a child/POI with one or more other persons at one detection area (e.g., a store exit) that does not match the one or more other persons previously identified/detected with the child/POI at another detection area (e.g., a store entrance).

Accordingly, the embodiments described herein provide systems and methods that integrate MM wave radar technology into a meshed access point (AP) system for the purpose of providing a feedback response (e.g., to the POI and/or another) based upon or in response to a physical movement or physical action detection of the POI at one or more detection areas that are covered by MM wave radar detectors. Such feedback information can be beneficial to both the POI (e.g., in enhancing a purchasing experience, or the safety of the POI in a particular environment) as well as to others associated with the detection area (e.g., store owners, firefighters, security and/or other safety personnel, etc.).

Thus, an example embodiment of a system comprises a millimeter (MM) wave radar detector, where the MM wave radar detector generates signal data associated with a person of interest (POI) within a field of view of the MM wave radar detector, and an Access Point (AP) coupled with the MM wave radar detector, the AP comprising a computing device to receive and analyze signal data provided by the MM wave radar detector to determine a movement or action of the POI within the field of view, and facilitate generation of a feedback response based upon or in response to the determined movement or action of the POI.

The system may comprise a plurality of MM wave radar detectors that generate signal data associated with the POI within a detection area that comprises a plurality of field of views for the MM wave radar detectors, and where the computing device of the AP generates an image of the POI based upon the signal data provided by the MM wave radar detectors.

The system may further comprise an external device controlled by the AP that provides the feedback response.

The external device of the system may comprise a motor connected to move an object as the feedback response. The motor may connect with a store shelf to move a product on the shelf as the feedback response.

The external device of the system may also comprise a display that provides content as the feedback response to the POI. The content provided by the display may comprise information about a product determined to be of interest to the POI based upon or in response to the determined movement or action of the POI within the field of view. In addition, the display may comprise a personal electronic device of the POI.

Further, the external device of the system may comprise a speaker that provides an audio response as the feedback response or a light element that turns on or off or changes intensity as the feedback response.

In another example embodiment, a method comprises scanning a detection area in which a person of interest (POI) is located with a plurality of millimeter (MM) wave radar detectors so as to generate signal data associated with the detection area, analyzing the signal data via a computing device to determine a movement or action of the POI, and facilitating generation, via the computing device, of a feedback response by an external device proximate the detection area, where the feedback response is based upon or in response to the determined movement or action of the POI.

The external device of the method may comprise a motor connected with a shelf in a store, and the facilitating generation of the feedback response may further comprise controlling, via the computing device, operation of the motor to move the shelf based upon or in response to the determined movement or action of the POI being associated with an object on the shelf.

The external device of the method may also comprise a display, and the facilitating generation of the feedback response may further comprise controlling, via the computing device, operation of the display to provide information about an object based upon or in response to the determined movement or action of the POI. The POI may be a customer, the detection area may comprise an area within in a store, the object may comprise a product or a representation of a product available for purchase in the store. The information provided about the object may comprise product information selected from the group consisting of purchase price of the product, one or more locations of the product within the store, a discount in purchase price associated with the product, product content or product specifications, and information about one or more alternative products related to the product. The determined movement or action of the customer may comprise an indication that the customer is holding the representation of the product, and the information provided about the object may further comprise an alert to an employee within the store that the customer is purchasing the product, where the method may further comprise facilitating transport of the product associated with the representation of the product that is held by the customer from a storage location of the product within the store to a purchase location within the store at which the customer purchases the product. In addition, the information provided about the object may comprise product information about an alternate location of the product in the store or an alternative product that is identified as related to the product. Further, the display may also comprise a personal electronic device of the POI, and the controlling operation of the display may comprise controlling, via the computing device, the personal electronic device of the POI to provide the information about the object.

The external device of the method may further comprise a speaker and/or a light element, and the facilitating generation of the feedback response may comprise controlling, via the computing device, an audio response emitted by the speaker and/or turning on or off or change in intensity of the light element.

The method may further comprise further scanning the detection area in which the POI is located with the MM wave radar detectors so as to generate further signal data associated with the detection area, further analyzing the further signal data via the computing device to determine a further movement or action of the POI, and facilitating generation, via the computing device, of a further feedback response by a second external device proximate the detection area. The further feedback response may be based upon or in response to the determined further movement or action of the POI, and the second external device may differ from the external device.

In a further example embodiment, one or more computer readable storage media may be provided and encoded with software comprising computer executable instructions and when the software is executed operable to control a plurality of millimeter (MM) wave radar detectors to scan a detection area in which a person of interest (POI) is located so as to generate signal data associated with the detection area, analyze the signal data to determine a movement or action of the POI, and facilitate generation of a feedback response by an external device proximate the detection area, where the feedback response is based upon or in response to the determined movement or action of the POI.

The external device of which a feedback response is generated via the computer readable storage media may comprise a motor connected with a shelf in a store, and the facilitating generation of the feedback response via the computer readable storage media may comprise controlling operation of the motor to move the shelf based upon or in response to the determined movement or action of the POI being associated with an object on the shelf.

The external device of which a feedback response is generated via the computer readable storage media may also comprise a display, and the facilitating generation of the feedback response may further comprise controlling operation of the display to provide information about an object based upon or in response to the determined movement or action of the POI.

The instructions of the computer readable storage media may be further operable to control the MM wave radar detectors to further scan the detection area in which the POI is located so as to generate further signal data associated with the detection area, further analyze the further signal data to determine a further movement or action of the POI, and facilitate generation of a further feedback response by a second external device proximate the detection area, where the further feedback response may be based upon or in response to the determined further movement or action of the POI, and the second external device may differ from the external device.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments of the access point (AP) and other components of the network system may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each component of the AP and/or other portions of the system network described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, Intranet, Internet, hardwire, modem connection, wireless, etc.). For example, the functions of the present embodiments may be distributed in any manner among the various computer devices, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The AP and other components of the system network may be implemented by any number of any type of communications network (e.g., LAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the system network. The database systems and/or storage structures may be remote from or local to the AP and/or other computing devices in the system network, and may store any desired data (e.g., data relating to contact center interaction routing).

The embodiments presented may be in various forms, such as a system, a method, and/or a computer program product at any possible technical detail or level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on one or more computing devices of the AP, partly on the computing device(s) of the AP, or as a stand-alone software package, partly on the computing device(s) of the AP and partly on a remote computer or entirely on the remote computer or another server. In the latter scenario, the remote computer may be connected to the computing device(s) of the AP through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and/or block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a plurality of millimeter (MM) wave radar detectors that generate signal data associated with a person of interest (POI) within detection areas and based upon a movement of the POI within an environment; and
an Access Point (AP) separate from the MM wave radar detectors, the AP comprising a computing device to:

receive and analyze signal data provided by the MM wave radar detectors, the analyzing signal data comprising generating a MM wave radar image of the POI and MM wave radar images of one or more other persons with the POI in three dimensional space so as to identify the POI and first one or more other persons with the POI as well as movement of the POI and the first one or more other persons with the POI within the environment;

determine, using the MM wave radar images of the first one or more other persons with the POI, when the first one or more other persons with the POI detected at a first detection area does not match second one or more other persons with the POI detected at a second detection area; and facilitate generation of a feedback response in response to the determined movement of the POI and a determination that the first one or more other persons with the POI at the first detection area does not match the second one or more other persons with the POI detected at the second detection area, wherein the feedback response is a visual and audio response provided as feedback information to the first one or more other persons.

2. The system of claim 1, wherein the computing device accesses a personal electronic device of the POI and further identifies the POI based upon a unique identifier associated with the personal electronic device of the POI.

3. The system of claim 2, wherein the first detection area is an entrance to the environment and the second detection area is an exit from the environment.

4. The system of claim 1, further comprising:
an electronic device controlled by the AP that provides the feedback response.

5. The system of claim 4, wherein the electronic device comprises a visual display that provides the feedback information as the feedback response.

6. The system of claim 5, wherein the environment is a building, and wherein the computing device further causes to be produced on the visual display flashing lights that direct one or more personnel toward a location within the building based upon detected movements of the POI within the building.

7. The system of claim 4, wherein the environment is a building, and the first detection area is an entrance to the building and the second detection area is an exit from the building.

8. The system of claim 4, wherein the electronic device further comprises a speaker that provides audio as the feedback response.

9. The system of claim 1, wherein the computing device further generates an alert to security personnel.

10. A method comprising:
scanning detection areas within an environment in which a person of interest (POI) is located with a plurality of millimeter (MM) wave radar detectors so as to generate signal data associated with the detection areas;
analyzing the signal data via a computing device to generate a MM wave radar image of the POI and MM wave radar images of one or more other persons with the POI in three dimensional space so as to identify the POI and first one or more other persons with the POI as well as detect movement of the POI and the first one or more other persons with the POI within the environment;
determining, using the MM wave radar images of the first one or more other persons with the POI, when the first one or more other persons with the POI detected at a first detection area does not match second one or more other persons with the POI detected at a second detection area; and
facilitating generation, via the computing device, of a feedback response in response to the determined movement of the POI and a determination that the first one or more other persons with the POI at the first detection area does not match the second one or more other persons with the POI detected at the second detection area, wherein the feedback response is a visual and audio response provided as feedback information to the first one or more other persons.

11. The method of claim 10, wherein the analyzing further comprises:
accessing a personal electronic device of the POI; and
identifying the POI based upon a unique identifier associated with the personal electronic device of the POI.

12. The method of claim 11, wherein the first detection area is an entrance to the environment and the second detection area is an exit from the environment.

13. The method of claim 10, wherein the feedback response is provided via an electronic device.

14. The method of claim 13, wherein the electronic device comprises a visual display that provides the feedback information as the feedback response.

15. The method of claim 14, wherein the environment is a building, and the first detection area is an entrance to the building and the second detection area is an exit from the building.

16. The method of claim 14, wherein the environment is a building, and further comprising producing on the visual display flashing lights that direct one or more personnel toward a location within the building based upon detected movements of the POI within the building.

17. The method of claim 13, wherein the electronic device further comprises a speaker that provides audio as the feedback response.

18. The method of claim 10, further comprising facilitating generation, via the computing device, of an alert to security personnel.

19. One or more computer readable storage media encoded with software comprising computer executable instructions and when the software is executed operable to:
control a plurality of millimeter (MM) wave radar detectors to scan detection areas within an environment in which a person of interest (POI) is located so as to generate signal data associated with the detection areas;
analyze the signal data to generate a MM wave radar image of the POI and MM wave radar images of one or more other persons with the POI in three dimensional space to identify the POI and the first one or more other persons with the POI as well as movement of the POI and the first one or more other persons with the POI within the environment;
determine, using the MM wave radar images of the first one or more other persons with the POI, when the first one or more other persons with the POI detected at a first detection area does not match second one or more other persons with the POI detected at a second detection area; and
facilitate generation of a feedback response in response to the determined movement of the POI and a determination that the first one or more other persons with the POI at the first detection area does not match the second one or more other persons with the POI detected at the second detection area, wherein the feedback response is a visual and audio response provided as feedback information to the first one or more other persons.

20. The one or more computer readable storage media of claim 19, wherein the computer executable instructions are further operable to:
   access a personal electronic device of the POI; and
   identify the POI based upon a unique identifier associated with the personal electronic device of the POI.

21. The one or more computer readable storage media of claim 20, wherein the first detection area is an entrance to the environment and the second detection area is an exit from the environment.

22. The one or more computer readable storage media of claim 19, wherein the environment is a building, and the computer executable instructions facilitate generation of an alert by controlling a plurality of flashing lights to direct one or more personnel toward a location within the building based upon detected movements of the POI within the building.

* * * * *